R. S. WILE.
REDUCTION OF SCRUFF AND DROSS.
APPLICATION FILED JUNE 28, 1907.
947,723.
Patented Jan. 25, 1910.
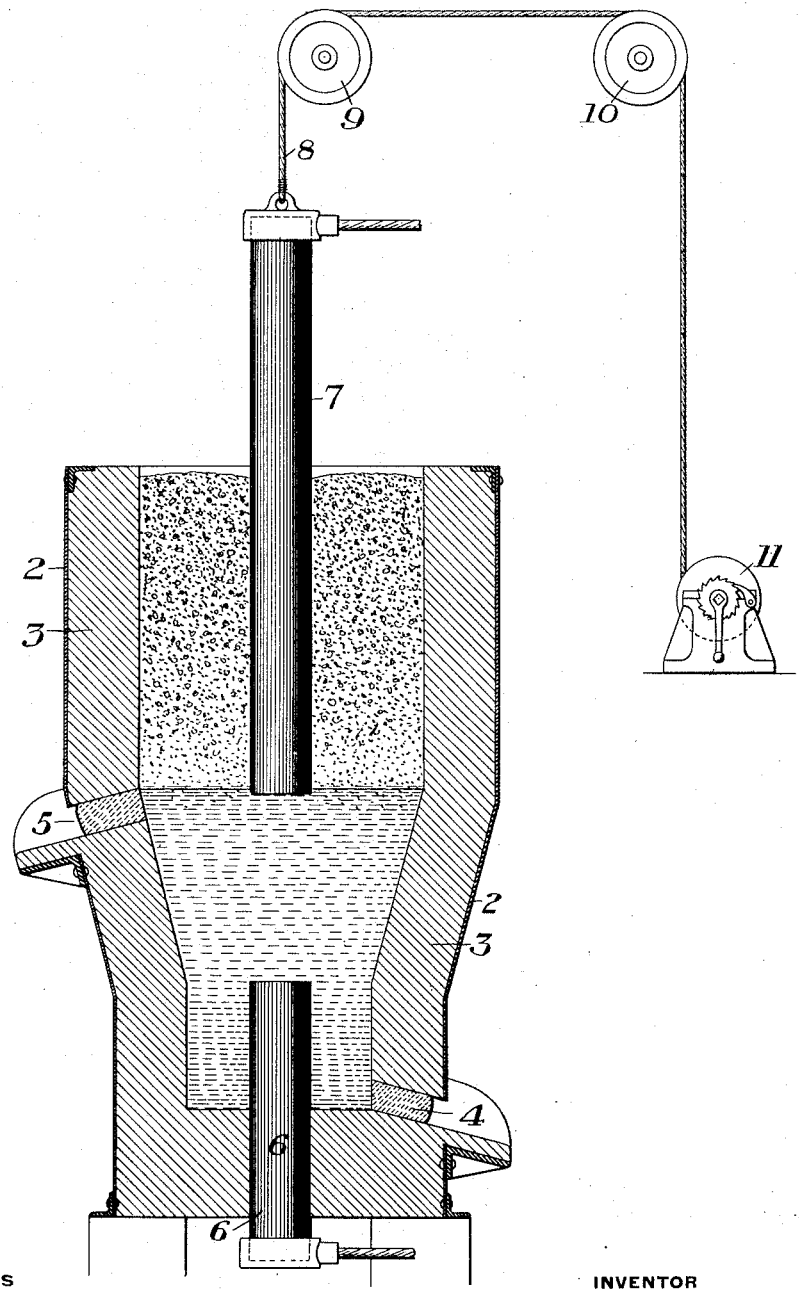
WITNESSES
INVENTOR

UNITED STATES PATENT OFFICE.

RAYMOND S. WILE, OF PITTSBURG, PENNSYLVANIA, ASSIGNOR TO AMERICAN SHEET & TIN PLATE COMPANY, OF PITTSBURG, PENNSYLVANIA, A CORPORATION OF NEW JERSEY.

REDUCTION OF SCRUFF AND DROSS.

947,723.     Specification of Letters Patent.     Patented Jan. 25, 1910.

Application filed June 28, 1907. Serial No. 381,208.

*To all whom it may concern:*

Be it known that I, RAYMOND S. WILE, of Pittsburg, Allegheny county, Pennsylvania, have invented a new and useful Improvement in the Reduction of Scruff and Dross, of which the following is a full, clear, and exact description, reference being had to the accompanying drawings, forming part of this specification, in which the figure is a vertical section showing one form of electric furnace for carrying out my method.

My invention relates to the reduction of scruff and dross from tinning, galvanizing and similar operations; and is designed to provide a method which will practically eliminate loss of metal and work rapidly and cheaply.

In carrying out my method, I employ an electric furnace, and use in conjunction therewith some form of carbon which will unite with the oxygen of the oxids in the dross or scruff under the electrically developed heat. I also employ in the lower portion of the furnace a well or body of neutral melted material, such as glass, within which the reduced metal descends; thus protecting it from oxidation, and enabling the globules to collect together, so that the metal may be tapped out.

In the drawings, in which I show a preferred form of electric furnace, though other types may be used, 2 represents a metal casing or shell lined with refractory material 3 which may be silica brick, or any other form of refractory brick or material. A tapping hole 4 is provided at the bottom; and I also preferably provide a tapping hole 5 at one side which is at or near the level of the melted glass or neutral bath.

6 and 7 represent carbon electrodes, one extending upwardly from the bottom of the furnace, in the form shown; and the other depending within the furnace. For convenience in adjusting the distance between the ends of the electrodes, I may suspend the upper electrode upon a wire rope or flexible connection 8 which may be laid over pulleys 9 and 10 to a winding drum or counter-weight. I have shown a winding drum 11 for this purpose.

In starting the furnace into operation, broken glass or glass batch material is fed into the furnace with the electrodes in contact with each other. The upper electrode is lifted slightly to form an arc, and as the glassy material is melted, the upper electrode is preferably lifted until it just dips into the bath of melted glass.

By the term "bath" I mean a body of molten material which is maintained for the purpose of passing the recovered metal thereinto and collecting it within the molten material, such material being inert or non-oxidizing for the purpose of preventing oxidation of the metal.

The scruff or dross or both is preferably mixed with some form of carbon, such as coke dust, and this mixture is fed into the furnace, and lies on the top of the glass bath. In many cases there is sufficient carbon in the scruff or dross itself to carry out the reducing operation, and in such case, I do not add further carbon. Under the heat received by this mixture through conduction and radiation, the carbon unites with the oxygen of the metal oxids, thus reducing them to the metal, as the charge descends within the furnace. This reduction takes place during the descent through the successively higher zones of heat, and the reduced metal passing through the layer of coke on the glass which performs the final reduction, (if the added coke is used) enters the glass bath, and descends and collects therein. This neutral bath protects the globules against oxidation, and assists them in uniting to form a body of molten metal which collects around the lower electrode, and may be tapped out from time to time through the lower tap hole. Successive charges of the mixture may be fed in from time to time.

If the glass bath and its upper portion becomes too refractory to remain properly molten, through mixture with materials from the charge, I may tap out this upper portion through the upper tap hole; and the operation may then be continued.

The advantages of my invention result from the use of the electric furnace method for the reduction of such materials. The loss of metal which occurs in present methods is practically eliminated. The volatilized metal which is formed in the lower portion of the charge is condensed as it rises through the upper portions of the charge, and if any metal oxids are volatilized they also rise through the charge and become reduced so that practically no metal escapes. The operation is rapid and may be cheaply carried out, and the cost of the furnace is small. The bath of neutral melted material is of advantage in preventing re-oxidation and collecting the globules of reduced metal. This neutral bath should be of less specific gravity than the reduced metal, so that such metal will descend through it.

Other types of electric furnace may be employed, and other materials than glass may be employed for forming the neutral fused bath.

Many other changes may be made in the process without departing from my invention.

I claim:—

1. The process of recovering metal from dross, scruff or dross and scruff, which consists in feeding the material into an electric furnace, and condensing any volatilized metal as it rises through the charge, and preventing oxidation of the condensed product within the furnace substantially as described.

2. The process of recovering metal from dross, scruff, or dross and scruff, which consists in maintaining a nonoxidizable bath in an electric furnace, feeding the material into the furnace, and condensing any volatilized metal as it rises through the charge, and permitting the metal to pass into and through the bath and collect therein, substantially as described.

3. The process of recovering metal from dross, scruff or dross and scruff, which consists in maintaining in an electric furnace a fused neutral bath of nonoxidizable material of less specific gravity than the metal to be recovered constituting a high resistance conductor, feeding the material into the furnace, condensing any volatilized metal as it rises through the charge, and permitting the metal to pass into and through the bath and collect therein, substantially as described.

4. The process of recovering metal from dross, scruff or dross and scruff, which consists in maintaining a fused neutral bath in an electric furnace, feeding the material under treatment mixed with carbonaceous material into the furnace and upon the bath, maintaining a layer of carbonaceous material upon the surface of the bath, condensing any volatilized metal as it rises through the charge, and permitting the metal to pass through the layer of carbonaceous material and through the bath and collect therein, substantially as described.

In testimony whereof, I have hereunto set my hand.

RAYMOND S. WILE.

Witnesses:
JOHN MILLER,
H. M. CORWIN.